United States Patent
Woerz et al.

(10) Patent No.: US 11,890,980 B2
(45) Date of Patent: Feb. 6, 2024

(54) TABLE ARRANGEMENT FOR AN AIRCRAFT AND PASSENGER CABIN AREA

(71) Applicants: Diehl Aviation Laupheim GmbH, Laupheim (DE); Airbus Operations GmbH, Hamburg (DE)

(72) Inventors: Wolfgang Woerz, Laupheim (DE); Ulrich Kress, Laupheim (DE); Ralf Braendle, Ulm (DE); Markus Ils, Walpertshofen (DE); Christian Heider, Achstetten (DE); Andreas Toborg, Hamburg (DE)

(73) Assignees: Diehl Aviation Laupheim GmbH, Laupheim (DE); Airbus Operations GmbH, Hamburg (DE)

( * ) Notice: Subject to any disclaimer, the term of this patent is extended or adjusted under 35 U.S.C. 154(b) by 0 days.

(21) Appl. No.: 17/693,640

(22) Filed: Mar. 14, 2022

(65) Prior Publication Data
US 2022/0194284 A1 Jun. 23, 2022

Related U.S. Application Data

(63) Continuation of application No. PCT/EP2020/075429, filed on Sep. 11, 2020.

(30) Foreign Application Priority Data

Sep. 12, 2019 (DE) ...................... 10 2019 124 550.8

(51) Int. Cl.
*B60N 3/00* (2006.01)
*B64D 11/06* (2006.01)

(52) U.S. Cl.
CPC .......... *B60N 3/001* (2013.01); *B64D 11/0638* (2014.12)

(58) Field of Classification Search
CPC ........................... B60N 3/001; B64D 11/0638
(Continued)

(56) References Cited

U.S. PATENT DOCUMENTS 1,809,866 A * 6/1931 Riesche ................... A47B 5/04
108/134
2,814,892 A * 12/1957 Larsen .................... D06F 81/06
108/135

(Continued)

FOREIGN PATENT DOCUMENTS

CA 2884688 * 4/2014 ......... B64D 11/0638
EP 2930109 A1 10/2015
(Continued)

*Primary Examiner* — Jose V Chen
(74) *Attorney, Agent, or Firm* — Laurence A. Greenberg; Werner H. Stemer; Ralph E. Locher (57) ABSTRACT

A table arrangement has a mounting element to be fastened to a fastening structure element. A first table element is connected to the mounting element, pivotally relative to the mounting element about a first pivot axis between a stowage position, in which the first table element extends substantially parallel to a mounting plane defined by the mounting element, and a position of use, in which the first table element extends substantially perpendicular to the mounting plane. A second table element is connected to the first table element substantially parallel to the first table element and rotatable relative to the first table element about a rotation axis that is parallel to the mounting plane in the position of use.

19 Claims, 6 Drawing Sheets

(58) Field of Classification Search
USPC .................... 108/48, 35, 40; 297/163
See application file for complete search history.

(56) References Cited

U.S. PATENT DOCUMENTS

| | | | | |
|---|---|---|---|---|
| 2,967,037 | A * | 1/1961 | Christle | A47B 3/02 108/35 |
| 4,829,910 | A * | 5/1989 | Lirette | A47B 83/045 108/35 |
| 5,337,682 | A * | 8/1994 | Wiseman | A47B 23/04 108/118 |
| 5,460,101 | A * | 10/1995 | Garbutt, Sr. | A47B 5/04 108/42 |
| 5,513,574 | A * | 5/1996 | Collins | A47B 5/06 108/70 |
| 6,382,745 | B1 * | 5/2002 | Adkins | B60N 3/002 248/441.1 |
| 6,412,423 | B1 * | 7/2002 | Elizondo, Jr. | A47B 83/045 211/104 |
| 6,543,369 | B1 * | 4/2003 | Swensson | A47B 23/046 108/103 |
| 7,100,316 | B2 * | 9/2006 | Obileye | A47B 77/10 38/139 |
| 8,205,563 | B2 * | 6/2012 | St. Louis | B64D 11/0638 108/42 |
| 8,596,206 | B2 * | 12/2013 | Legeay | B64D 11/0638 297/145 |
| 8,763,537 | B2 * | 7/2014 | Ng | A47B 3/083 297/331 |
| 10,709,235 | B1 * | 7/2020 | Brown | A47B 5/04 |
| 11,091,267 | B1 * | 8/2021 | Lawson | B64D 11/0605 |
| 2007/0227407 | A1 * | 10/2007 | Cartensen | B61D 37/006 108/33 |
| 2009/0078169 | A1 * | 3/2009 | Osborne | B61D 37/00 108/70 |
| 2015/0267757 | A1 | 9/2015 | Garing et al. | |
| 2015/0284088 | A1 * | 10/2015 | Gow | B64D 11/0605 108/44 |
| 2017/0021931 | A1 | 1/2017 | Stephens et al. | |
| 2018/0110323 | A1 * | 4/2018 | Enzinger | B64D 11/0638 |
| 2019/0061954 | A1 * | 2/2019 | Miedema | A47B 3/00 |
| 2022/0117389 | A1 * | 4/2022 | O'Hara | A47B 5/006 |
| 2022/0212585 | A1 * | 7/2022 | Maier | B60N 3/002 |

FOREIGN PATENT DOCUMENTS

| | | |
|---|---|---|
| WO | 2010021544 A1 | 2/2010 |
| WO | 2014051638 A1 | 4/2014 |

* cited by examiner

TABLE ARRANGEMENT FOR AN AIRCRAFT AND PASSENGER CABIN AREA

CROSS-REFERENCE TO RELATED APPLICATION

This application is a continuation, under 35 U.S.C. § 120, of copending International Patent Application PCT/EP2020/075429, filed Sep. 11, 2020, which designated the United States; this application also claims the priority, under 35 U.S.C. § 119, of German Patent Application DE 10 2019 124 550.8, filed Sep. 12, 2019; the prior applications are herewith incorporated by reference in their entirety.

FIELD AND BACKGROUND OF THE INVENTION

The invention relates to a table arrangement which is suitable for use in a passenger cabin of an aircraft. In addition, the invention relates to a passenger cabin area fitted with a table arrangement of this kind.

In modern means of transportation, in particular passenger aircraft, optimal utilization of the space available in a passenger cabin is of great economic importance. Crew members therefore normally use small multipurpose foldaway tables, which may be provided in the area of a galley or close to a flight attendant seat, for example, in order to perform writing tasks and the like.

SUMMARY OF THE INVENTION

The problem addressed by the invention is that of providing a table arrangement which is suitable for use in the passenger cabin of a means of transportation, which table arrangement provides a crew member, for example a purser, with an easily usable workstation which can be stowed away in a space-saving manner when it is not in use. In addition, the problem addressed by the invention is that of specifying a passenger cabin area fitted with a table arrangement of this kind.

With the above and other objects in view there is provided, in accordance with the invention, a table arrangement for an aircraft, the table arrangement comprising:

a mounting element to be fastened to a fastening structure element, said mounting element defining a mounting plane;

a first table element connected to said mounting element, said first table element being pivotable relative to said mounting element about a first pivot axis between a stowage position, in which said first table element extends substantially parallel to said mounting plane defined by said mounting element, and a position of use, in which said first table element extends substantially perpendicular to said mounting plane defined by said mounting element; and a second table element connected to said first table element, said second table element being arranged substantially parallel to said first table element and being rotatable relative to said first table element about an axis of rotation arranged parallel to said mounting plane when said first table element is in the position of use.

In other words, the novel table arrangement comprises a mounting element which can be fastened to a fastening structure element. For example, the mounting element of the table arrangement for fastening to a fastening structure element may be provided, which fastening structure element is designed in the form of a monument suitable for mounting in a passenger cabin, in particular an aircraft cabin. The monument may, for example, be a galley, a toilet module, a partition wall, a storage locker, or a comparable monument. The mounting element of the table arrangement defines a mounting plane. In the state of the table arrangement fastened to a fastening structure element, the mounting plane defined by the mounting element may extend substantially parallel to a wall surface of the fastening structure element which faces the mounting element, for example.

The table arrangement further comprises a first table element connected to the mounting element. The first table element is pivotable relative to the mounting element about a first pivot axis between a stowage position and a position of use. In its stowage position, the first table element extends substantially parallel to the mounting plane defined by the mounting element. In contrast to this, the first table element extends substantially perpendicularly to the mounting plane defined by the mounting element in its position of use. In this way, the first table element can either be stowed away in a space-saving manner or used as a workstation, depending on what is required.

Finally, the table arrangement comprises a second table element connected to the first table element. The second table element is arranged substantially parallel to the first table element and is rotatable relative to the first table element about an axis of rotation arranged parallel to the mounting plane in the position of use. The connection to the first table element means that the second table element is moved jointly with the first table element, when the first table element is pivoted between its stowage position and its position of use. When the first table element is located in its stowage position, the second table element arranged parallel to the first table element can therefore also be stowed away in a space-saving manner. By contrast, when the first table element is located in its position of use, the second table element can be moved through a rotation relative to the first table element about the axis of rotation into a position which allows both the first table element and the second table element to be used as a workstation. In this way, a comparatively generously sized workstation is created.

The second table element is preferably connected to the first table element in the region of an end of the first table element facing away from the first pivot axis. In this way, the work surface provided by the first and the second table element can be maximized. In particular, the axis of rotation is also arranged in the region of one end of the first table element facing away from the first pivot axis. The end of the first table element facing away from the first pivot axis preferably has a rounded design. In addition or alternatively to this, an end of the second table element connected to the first table element may likewise have a rounded design. By contrast, a free end of the second table element may have a straight edge.

In addition or alternatively to this, a frictional force generating element may be provided in the region of the axis of rotation, which element is set up to minimize unwanted movement of the second table element relative to the first table element about the axis of rotation. The frictional force generating element is preferably arranged in the region of the axis of rotation between the first and the second table element and may be made of a plastic material, an elastomer material, or the like, for example, in order to counteract an unwanted rotation of the second table element about the axis of rotation.

In one embodiment, the frictional force generating element is configured in such a manner that it produces a constant, lasting frictional force. This frictional force can be adjusted once, for example during the mounting of the table arrangement, by means of a screw or the like. If desired, the frictional force generating element may, however, also be configured in such a manner that the frictional force applied by it is variable and manually adjustable. A user of the table arrangement can then rotate the second table element about the axis of rotation, for example with the frictional force generating element deactivated to begin with, and can subsequently activate the frictional force generating element, in order to keep the second table element in its position.

In a preferred embodiment of the table arrangement, the second table element is rotatable about the axis of rotation between an overlapping position and a working position. If the second table element is located in its overlapping position relative to the first table element, the first and the second table elements are preferably arranged in a position in which they overlap one another to the maximum, i.e., a surface by which one of the two table elements projects beyond the other table element is minimized. A longitudinal axis, in particular the center longitudinal axis of the first table element, then extends preferably parallel to a longitudinal axis, in particular a center longitudinal axis of the second table element. If the first table element is located in its stowage position, the second table element is preferably arranged in its overlapping position relative to the first table element. In this way, the space required by the table arrangement is minimized. The axis of rotation is arranged perpendicularly to the two center longitudinal axes of the first and second table element, in particular at a point of intersection between the two center longitudinal axes. Consequently, the axis of rotation intersects the two center longitudinal axes, in particular at the point of intersection.

In contrast with this, the longitudinal axis of the first table element may form an angle of approx. 80 to 120°, in particular an angle of approx. 90 to 110°, with the longitudinal axis of the second table element, when the second table element is located in its working position relative to the first table element. The longitudinal axis of the first table element may extend substantially perpendicularly to the mounting plane defined by the mounting element, for example, when the first table element is located in its position of use. In this way, a particularly convenient workstation with two "table legs" can be created.

In addition or alternatively to this, the second table element may be displaceable relative to the first table element in a direction parallel to the longitudinal axis of the first table element and the longitudinal axis of the second table element, when the first table element is arranged in its stowage position. In particular, the second table element may be connected to the first table element, in such a manner that it is displaceable relative to the first table element in the direction of the first pivot axis parallel to the longitudinal axis of the first table element, and the longitudinal axis of the second table element, when the first table element is arranged in its stowage position.

The second table element preferably has a smaller surface than the first table element. For example, the second table element may have a shorter dimension in the direction of its longitudinal axis than the first table element in the direction of its longitudinal axis. In addition or alternatively to this, the second table element may be designed to be congruent to a portion of the first table element, i.e., the second table element may be formed in such a manner that it completely overlaps a portion of the second table element, when it is arranged in its overlapping position relative to the first table element. The portion of the table element which is designed to be congruent to the second table element preferably forms a portion of the first table element which faces away from the first pivot axis.

The first table element may be provided with a first edge protection profile. The first edge protection profile, which may be made of a suitable plastic material, for example, may extend along at least one portion of a peripheral edge of the first table element. The first edge protection profile preferably extends along the entire peripheral edge of the first table element and thereby forms a continuous border of a table surface of the first table element. In addition or alternatively to this, the second table element may also be provided with a second edge protection profile, which may be made of a suitable plastic material, for example, and preferably extends along at least one portion of a peripheral edge of the second table element. The second edge protection profile preferably extends along the entire peripheral edge of the second table element, and therefore forms a continuous border of a table surface of the second table element. An edge protection profile protects an edge region of the first and/or of the second table element from damage.

The first edge protection profile preferably projects in a direction parallel to the axis of rotation beyond the table surface of the first table element. In addition or alternatively to this, the second edge protection profile may also project in a direction parallel to the axis of rotation beyond the table surface of the second table element. An edge protection profile design of this kind guarantees that spilt liquids are retained, at least up to a certain amount, and secures items placed on the table arrangement to prevent them from slipping off.

The table surface of the first table element may have an anti-slip design. In addition or alternatively to this, the table surface of the second table element may also have an anti-slip design. For example, the first table element and/or the second table element may be made of anti-slip material or be provided with an anti-slip or no-slip coating.

In a preferred embodiment of the table arrangement, the second table element is arranged in such a manner relative to the first table element, that an underside of the second table element faces the table surface of the first table element. This allows a particularly simple operation of the table arrangement, in particular during the transfer of the second table element between its overlapping position and its working position and during the transfer of the first table element between the position of use and its stowage position.

The first table element and the second table element are preferably of such a size that a user of the table arrangement can place three A4 sheets (DIN A4) on the first table element and the second table element. In particular, the first table element is formed in such a manner that its size in the direction of its longitudinal axis is greater than its size in a direction perpendicular to its longitudinal axis. In addition, or as an alternative, the second table element may be formed in such a manner that its size in the direction of its longitudinal axis is greater than its size in a direction perpendicular to its longitudinal axis. The dimensions of the first table element in the direction of its longitudinal axis and perpendicular to its longitudinal axis are preferably such that a user of the table arrangement can place two DIN A4 sheets on the first table element in landscape format. The dimensions of the second table element in the direction of its longitudinal axis and perpendicular to its longitudinal axis are preferably such that a user of the table arrangement can place a DIN A4 sheet on the second table element in landscape format.

In addition, a handle may be configured on the first table element. The handle may be gripped by a user when the first table element is to be pivoted between its stowage position and its position of use. The handle is provided, in particular, in the region of the end of the first table element facing away from the first pivot axis. For example, the handle may be designed in the form of a recess which is formed in an underside of the first table element opposite the table surface of the first table element.

The first pivot axis, about which the first table element is pivotable between its stowage position and its position of use, is preferably movable relative to the mounting element between a resting position and an operating position, during a transfer of the first table element between its stowage position and its position of use. The movement of the first pivot axis relative to the mounting element may be a translational movement of the first pivot axis in the mounting plane defined by the mounting element. During a transfer of the first table element between its stowage position and its position of use, it therefore follows that the end of the first table element facing the first pivot axis not only performs a movement about the first pivot axis, but also a translational movement in the mounting plane.

When the table arrangement is mounted ready for use on a fastening structure element in an aircraft cabin, the first pivot axis is displaced upwardly during a transfer of the first table element from its stowage position into its position of use, preferably in the mounting plane defined by the mounting element. Conversely, when the first table element is transferred from its position of use into its stowage position, the first pivot axis is preferably displaced downwardly in the mounting plane defined by the mounting element relative to the mounting element. The displaceable embodiment of the first pivot axis allows a particularly space-saving embodiment of the table arrangement, since the first table element thereby projects in its stowage position in the direction of its longitudinal axis substantially less beyond the mounting element than this would be the case with an arrangement with a rigid first pivot axis.

The table arrangement may, in addition, comprise a guide device for guiding the movement of the first pivot axis between its inoperative position and its operating position. For example, the guide device may comprise at least one guide rail in which one end of the first pivot axis is displaceably received. The guide device preferably comprises two guide rails which are substantially parallel to one another, which each receive one end of the first pivot axis displaceably. The guide device, i.e., the guide rail(s) of the guide device is/are preferably fastened to the mounting element.

In a preferred embodiment, the mounting element of the table arrangement comprises two side walls. The side walls of the mounting element may extend substantially perpendicular to the mounting plane defined by the mounting element. In addition or alternatively to this, the side walls of the mounting element may extend substantially parallel to one another. In addition or alternatively to this, the mounting element may comprise a rear wall. The rear wall preferably extends in the mounting plane defined by the mounting element.

The table arrangement preferably further comprises a locking mechanism for locking the first table element in its position of use. The locking mechanism may, for example, comprise a first locking element connected to the mounting element, and also a second locking element complementary to the first locking element and connected to the first table element. The locking element may, for example, be attached to the first table element in the region of the end of the first table element facing the first pivot axis.

In a particularly preferred embodiment, the locking mechanism is configured in such a manner that it can be activated by applying a compressive force to the table surface of the first table element arranged in its position of use. For example, the first and/or the second locking element of the locking mechanism may be arranged and constructed in such a manner they automatically come into engagement with one another, as soon as a user applies a corresponding compressive force to the table surface of the first table element arranged in its position of use.

In addition or alternatively to this, the locking mechanism may be configured in such a manner that its activation is associated with an audible noise. For example, the first and/or the second locking element of the locking mechanism may be constructed in such a manner that a clicking noise can be heard when the two locking elements are in engagement with one another. A user of the table arrangement then receives an audible signal indicating to him or her that the first table element is securely in its position of use.

Furthermore, the table arrangement may comprise a manually actuable release mechanism for releasing the locking mechanism. The release mechanism may be fastened to the mounting element. For example, the release mechanism may comprise a control button which is connected to the first locking element of the locking mechanism via a connection element. The control button may, for example, be fastened to a holding element, which extends between the two side walls of the mounting element. A manual operation, for example pressing of the control button, may be transferred to the locking element via the connecting element, as a result of which the first locking element can be released from the second locking element.

In addition, the table arrangement may be a manually actuable release mechanism for releasing the locking mechanism. The release mechanism may be fastened to the mounting element. For example, the release mechanism may comprise a control button which is connected to the first locking element of the locking mechanism by means of a connection element. The control button maybe fastened to a holding element, for example, which extends between the two side walls of the mounting element. Manual operation, for example pressing of the control button, can be transferred to the first locking element by means of the connection element, as a result of which the first locking element can be released from the second locking element.

The table arrangement preferably further comprises a support element, the first end of which is connected to the mounting element so as to be pivotable about a second pivot axis. A second end of the support element, on the other hand, is preferably connected to the first table element so as to be pivotable about a third pivot axis. In particular, the second end of the support element is connected to an underside of the first table element. The support element is therefore pivotable relative to the mounting element and the first table element between a rest position and a support position. In its rest position, which is adopted by the support element when the first table element is located in its stowage position, the support element is arranged substantially parallel to the first table element. In its support position, which is adopted by the support element when the first table element is located in its position of use, a longitudinal axis of the first table element, on the other hand, forms an angle of approx. 30 to 60°, in particular an angle of approx. 40 to 50°, and particularly preferably an angle of approx. 45°, with a longitudinal axis of the support element.

The support element provides the first table element with a greater load-bearing capability, so that the first table element can support a greater load than the second table element. The support element is preferably of such a size that the first table element can support a 5 kg load. This makes it possible for a user of the table arrangement to be able to place an electronic device, such as a tablet or a lightweight laptop, for example, on the first table element.

Moreover, the table arrangement may comprise a securing mechanism for securing the first table element in it stowage position. The securing mechanism may comprise at least one securing lever, for example, which can be attached to the mounting element so that it is rotatable about an axis of rotation. If the securing lever is located in a securing position, it preferably lies against an underside of the first table element opposite the table surface of the first table element or against the support element, and thereby holds the first table element in its stowage position. On the other hand, if the securing lever is located in a release position, it releases the first table element or the support element, so that the first table element can be moved from its stowage position into its position of use. In order to guarantee particularly reliable securing of the first table element in its stowage position, the securing mechanism may be provided with two securing levers. The securing mechanism then fulfils the requirements for aircraft licensing. The two securing levers are preferably fastened to the mounting element in such a manner that, in their securing position in the region of two peripheral regions of the first table element lying opposite one another, they lie against the underside of the first table element or in the region of two peripheral regions of the support element lying opposite one another.

A passenger cabin area, in particular an aircraft passenger cabin area, comprises a fastening structure element and a table arrangement described above. The fastening structure element is, in particular, designed in the form of a monument, for example a galley, a toilet module, a partition wall, a storage locker, or a comparable monument. The mounting element of the table arrangement is fastened to the fastening structure element.

In a preferred embodiment of the passenger cabin area, a seat, in particular a flight attendant's seat, is fastened to the fastening structure element adjacent to the table arrangement. The table arrangement is then optimally usable for a person sitting on the seat.

Other features which are considered as characteristic for the invention are set forth in the appended claims.

Although the invention is illustrated and described herein as embodied in a table arrangement for an aircraft and passenger cabin area, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Referring now to the figures of the drawing in detail FIGS. 1 to 9 illustrate a table arrangement 10 according to the invention in various operating states. As can be seen in FIG. 10 the table arrangement 10 is configured for the installation in a passenger cabin area, in particular an aircraft passenger cabin area 100. The table arrangement 10 comprises a mounting element 12 which can be fastened to a fastening structure element 102 installed in the aircraft passenger cabin area 100. In the aircraft passenger cabin area 100 depicted in FIG. 10, the fastening structure element 102 is configured in the form of an aircraft galley, i.e., the mounting element 12 is fastened to a side wall of the aircraft galley. In the alternative, however, it is also possible for the mounting element 12, and therefore the table arrangement 10, to be fixed to a fastening structure element 102 that is a partition wall, in the form of a toilet module, in the form of a storage locker, or in the form of a comparable monument or structure. A flight attendant's seat 104 is fastened to the fastening structure element 102 adjacent the table arrangement 10.

As can best be seen in FIG. 2 and FIGS. 4 to 7, the mounting element 12 comprises two side walls 14, 16, which extend substantially parallel to one another. The side walls 14, 16 are connected to one another by a rear wall 18. In order to fasten the mounting element 12 to the fastening structure element 102, the rear wall 18 of the mounting element 12 is fixed to the fastening structure element 102 by screws, rivets or comparable fastening elements, for example. The mounting element 12 therefore defines a mounting plane E which extends substantially perpendicularly to the side walls 14, 16 of the mounting element 12. The rear wall 18 of the mounting element 12, on the other hand, extends in the mounting plane E.

In addition, the table arrangement 10 comprises a first table element 20 connected to the mounting element 12. The first table element 20 is pivotable relative to the mounting element 12 about a first pivot axis S1 between a stowage position shown in FIGS. 1 to 3 and a position of use illustrated in FIGS. 5 to 9. The first pivot axis S1 extends substantially parallel to the mounting plane E defined by the mounting element 10.

In its stowage position, the first table element 20 is arranged substantially parallel to the mounting plane E defined by the mounting element 12. On the other hand, a first table element 20 arranged in its position of use extends substantially perpendicularly to the mounting plane E defined by the mounting element 12.

The first table element 20 is formed in such a manner that its size in the direction of its center longitudinal axis L1 is greater than its size in a direction perpendicular to its center longitudinal axis L1. If the first table element 20 is arranged in its stowage position, the center longitudinal axis L1 of the first table element extends substantially parallel to the mounting plane E defined by the mounting element 12. On the other hand, if the first table element 20 is arranged in its position of use, the center longitudinal axis L1 of the first table element 20 extends substantially perpendicularly to the mounting plane E defined by the mounting element 12.

The table arrangement 10 further comprises a second table element 22 connected to the first table element 20. In particular, the second table element 22 is connected to the first table element 20 in the region of an end of the first table element 20 facing away from the first pivot axis S1. The axis of rotation D is likewise arranged in the region of an end of the first table element 20 facing away from the first pivot axis S1. In the case of the embodiment of a table arrangement 10 illustrated in the figures, the end of the first table element 20 facing away from the first pivot axis S1, which table element is connected to the second table element 22, is rounded in design. An end of the second table element 22 connected to the first table element 20 is likewise rounded in design. In contrast to this, a free end of the second table element 22 has a straight edge.

The second table element 22 extends substantially parallel to the first table element 20 and is, in particular, arranged relative to the first table element 20 in such a manner that an underside 24 of the second table element 22 faces a table surface 26 of the first table element 20. Similarly to the first table element 20, the second table element 22 is also formed in such a manner that its size in the direction of its center longitudinal axis L2 is greater than its size in a direction perpendicular to its center longitudinal axis L2.

The second table element 22 is jointly pivotable with the first table element 20 about the first pivot axis S1. In other words, when the first table element 20 is located in its stowage position, in which the first table element 20 extends substantially parallel to the mounting plane E defined by the mounting element 12, the second table element 22 likewise extends substantially parallel to the mounting plane E. The center longitudinal axis L2 of the second table element 22 then extends, just like the center longitudinal axis L1 of the first table element 20, substantially parallel to the mounting plane E. On the other hand, if the first table element 20 is located in its position of use, in which the first table element 20 extends substantially perpendicularly to the mounting plane E defined by the mounting element 12, the second table element 22 likewise extends substantially perpendicularly to the mounting plane E.

Figure 5:
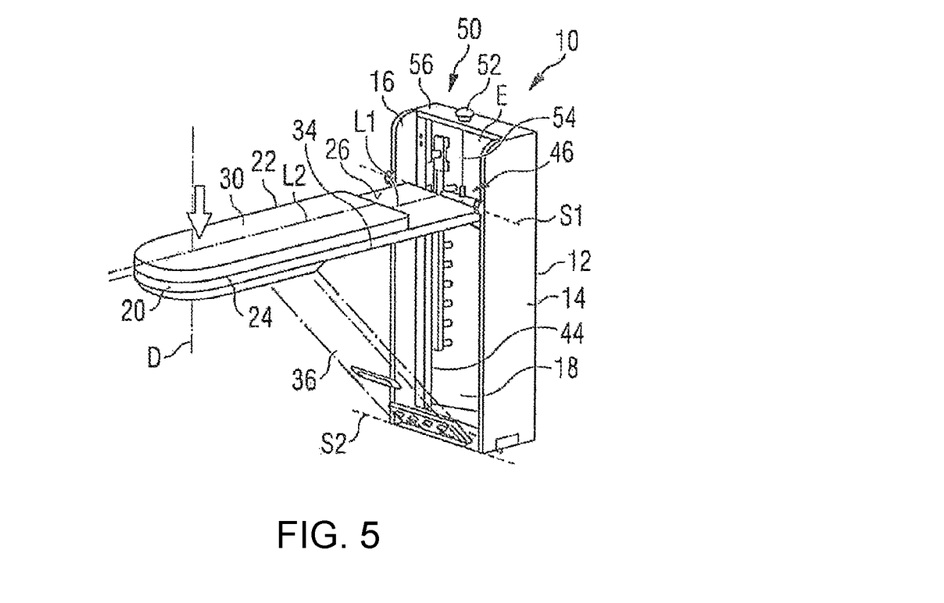
FIG. 5 is a perspective view of the table arrangement according to FIGS. 3 and 4, wherein the first table element of the table arrangement adopts its position of use, while a second table element is arranged in an overlapping position relative to the first table element.
Figure 6A:
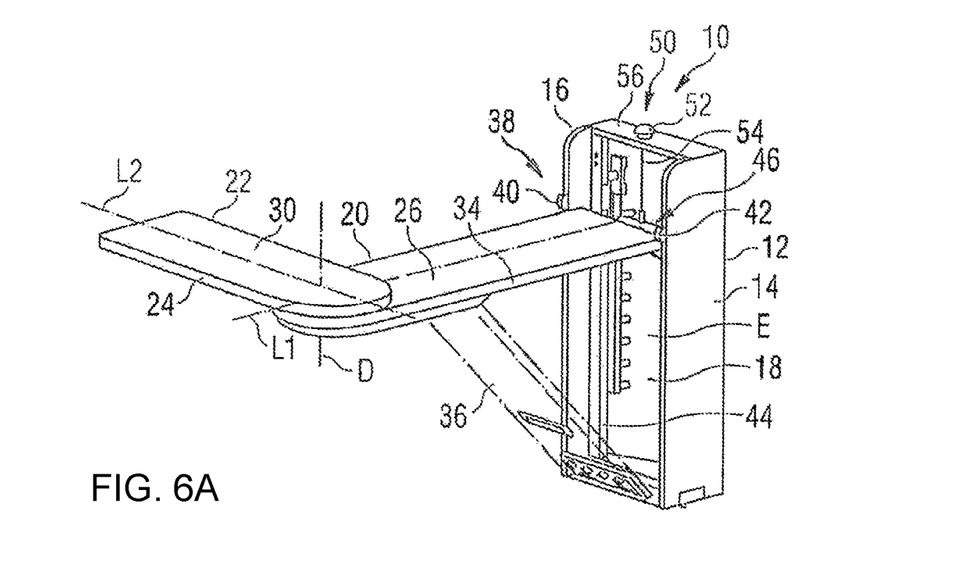
FIGS. 6A and 6B are perspective views showing the table arrangement according to FIG. 5, wherein the second table element is arranged in a working position relative to the first table element.
Figure 6B:
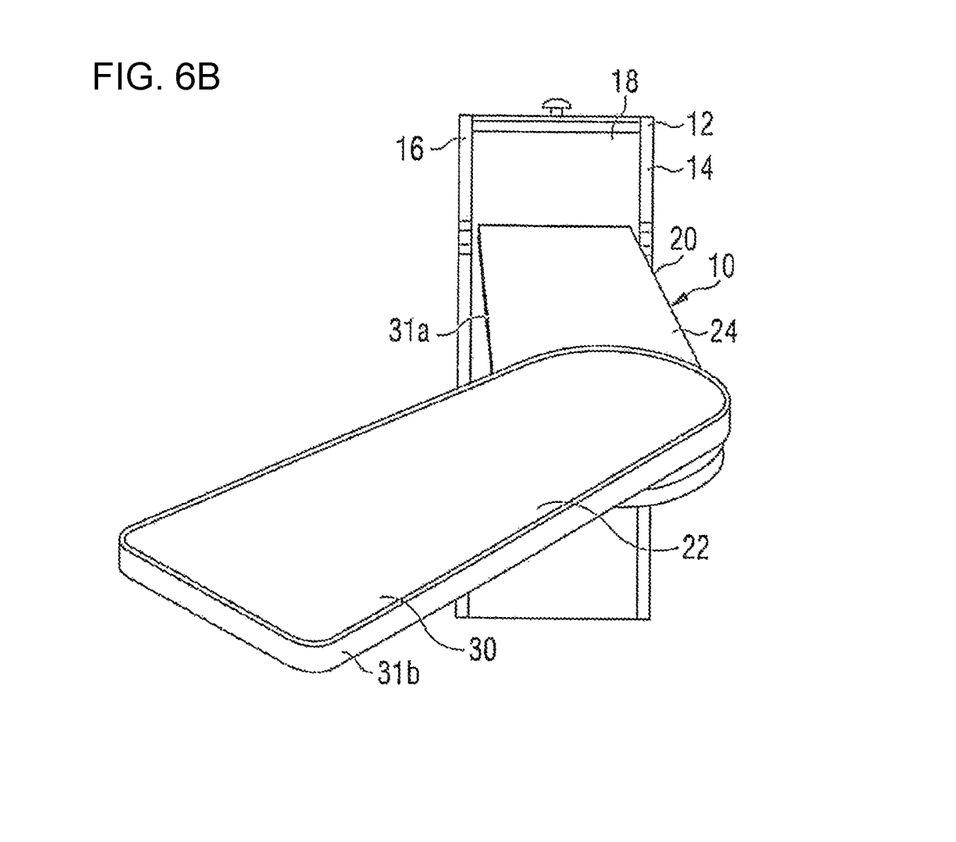
Figure 9:
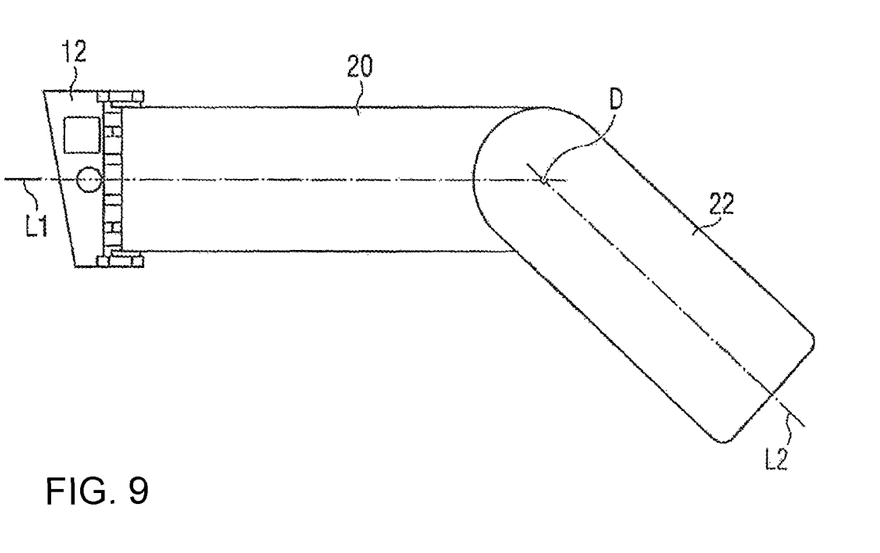
FIG. 9 is a plan view showing the table arrangement according to FIG. 8.
Figure 10:
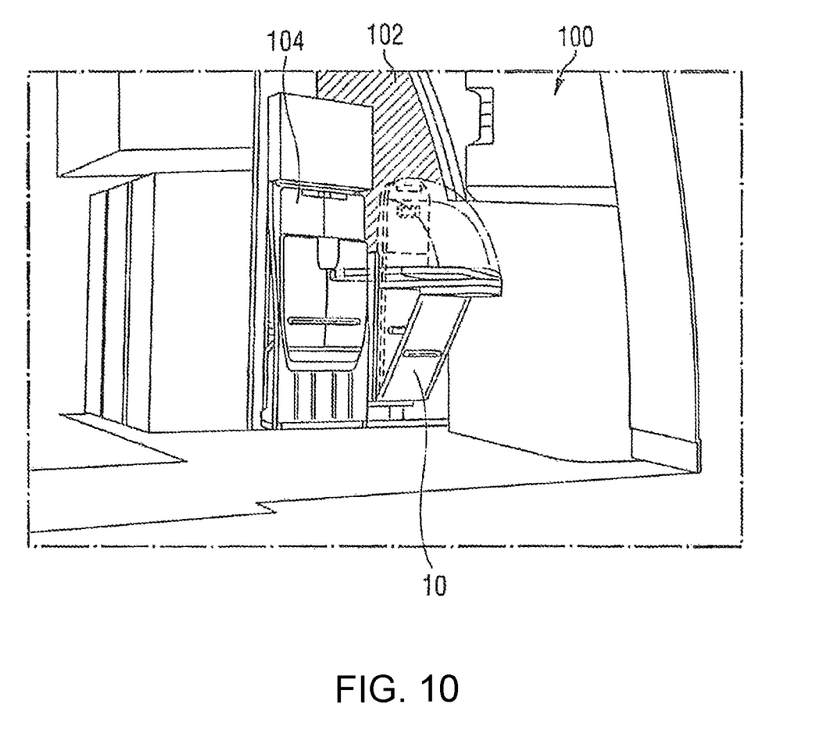
FIG. 10 is a partial view of an aircraft passenger cabin area fitted with a table arrangement according to FIGS. 1 to 9.

As becomes especially clear from a comparison between FIG. 5 on the one hand and FIGS. 6A, 6B, and 9, on the other hand, the second table element 22 is rotatable relative to the first table element 20 about an axis of rotation D. The axis of rotation D is arranged in the position of use of the table elements 20, 22 parallel to the mounting plane (E). It intersects the two center longitudinal axes L1, L2 at a point of intersection and stands perpendicularly on the intersection point. In particular, the second table element 22 can be rotated relative to the first table element 20 about the axis of rotation D between an overlapping position shown in FIG. 5 and a working position illustrated in FIGS. 6 to 9.

Moreover, the second table element 22 is displaceable relative to the first table element 20 in a direction parallel to the longitudinal axis L1 of the first table element 20 and the longitudinal axis L2 of the second table element 20, at least when the first table element 20 is arranged in a stowage position. In particular, the second table element 22 is connected to the first table element 20 in such a manner that it is displaceable relative to the first table element 20 in the direction of the first pivot axis S1 parallel to the longitudinal axis L1 of the first table element 20 and the longitudinal axis L2 of the second table element 22 when the first table element 20 is arranged in its stowage position. The first table element 20 arranged in its stowage position therefore projects farther upward from the mounting element 12 than the second table element 22, see FIGS. 2 and 3.

When the second table element 22 is arranged in its overlapping position relative to the first table element 20, the first and the second table element 20, 22 are arranged in a position in which they overlap one another to the maximum, i.e., a surface by which one of the two table elements projects beyond the other table element is minimized. In the case of the embodiment of a table arrangement 10 illustrated in the figures, the second table element 22 has a smaller surface than the first table element 20. In particular, the second table element 22 has a shorter dimension in the direction of its center longitudinal axis L2 than the first table element 20 in the direction of its center longitudinal axis L1.

Otherwise, however, the second table element 22 is designed congruently to a portion of the first table element 20, i.e., the second table element 22 is formed in such a manner that it completely overlaps a portion of the first table element 20 when it is arranged in its overlapping position relative to the first table element 20. The portion of the first table element 20 designed to be congruent to the second table element 22 forms a portion of the first table element 20 facing away from the first pivot axis S1, so that only one portion of the first table element 20 adjacent to the first pivot axis S1 is not covered by the second table element 22, when the second table element 22 is arranged in its overlapping position relative to the first table element 20.

Figure 1:
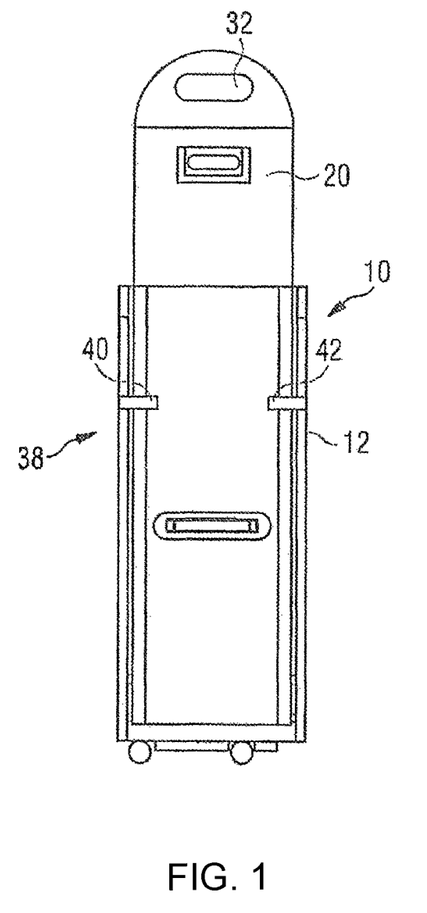
FIG. 1 is a front elevation view of a table arrangement suitable for use in a passenger cabin, in particular an aircraft passenger cabin, wherein a first table element of the table arrangement is located in a stowage position.
Figure 2:
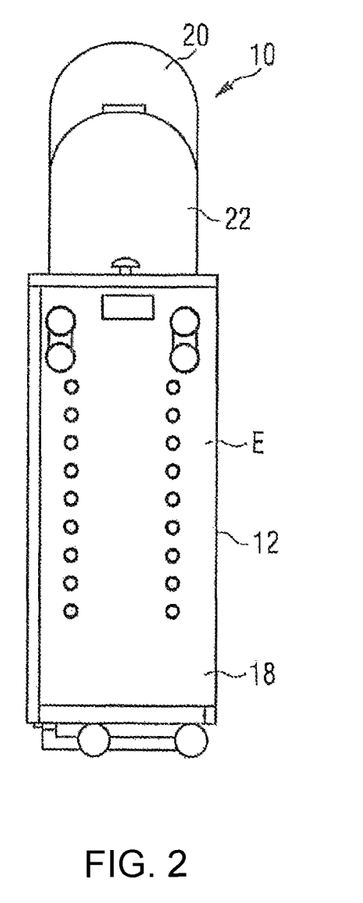
FIG. 2 is a rear view of the table arrangement according to FIG. 1.
Figure 3:
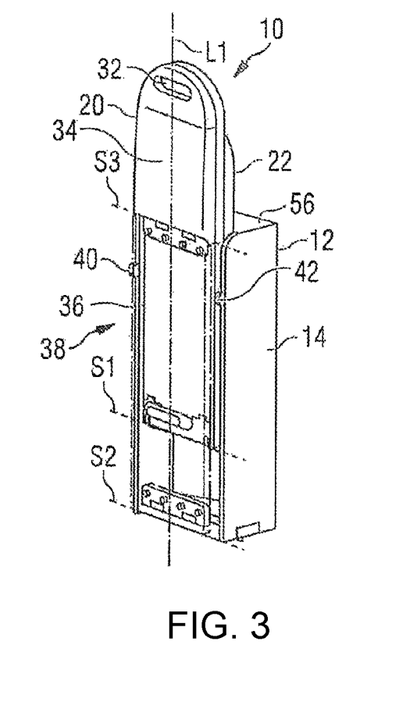
FIG. 3 is a perspective view of the table arrangement of FIG. 1.

When the first table element 20 is located in its stowage position, the second table element 22 is constantly arranged in its overlapping position relative to the first table element 20, in order to minimize the space required by the table arrangement 10, see FIGS. 1 to 3. On the other hand, when the first table element 20 is located in its position of use, the second table element 22 can remain in its overlapping position shown in FIG. 5, in which the center longitudinal axis L2 of the second table element 22 extends substantially parallel to the center longitudinal axis L1 of the first table element 20 and substantially perpendicularly to the mounting plane E. The second table element 22 may, however, also be rotated about the axis of rotation D relative to the first table element 20 into its working position as illustrated in FIGS. 6 to 9.

When the second table element 22 is located in its working position, the center longitudinal axis L1 of the first table element 20 forms an angle between approx. 80 to 120°, in particular an angle of approx. 90 to 110°, with the center longitudinal axis L2 of the second table element 22. In this way, a comfortable workstation with two "table legs" is created for a person sitting on the flight attendant's seat 104.

In the embodiment of a table arrangement 10 shown in the figures, the first table element 20 and the second table element 22 are of such a size that a user of the table arrangement 10 can place three DIN A4 sheets on the first table element 20 and the second table element 22. In particular, the table surface 26 of the first table element 20 has an anti-slip design and is suitable for receiving two DIN A4 sheets (also, letter size) in landscape format, while a table surface 30 of the second table element 22, which is likewise anti-slip in design, is suitable for receiving a DIN A4 sheet (also, letter size) in landscape format.

As can best be seen from FIG. 6B, the first table element 20 is provided with a first edge protection profile 31a, which extends along the entire peripheral edge of the first table element 20, and therefore forms a continuous border of the table surface 26 of the first table element 20. Accordingly, the second table element 22 is provided with a second edge protection profile 31b, which extends along the entire peripheral edge of the second table element 22, and therefore forms a continuous border of the table surface 30 of the second table element 22. The edge protection profiles 31a, 31b are each made of a suitable plastic material and protect peripheral regions of the table elements 20, 22 from damage.

In addition, the first edge protection profile 31a projects in a direction parallel to the axis of rotation D beyond the table surface 26 of the first table element 20, while the second edge protection profile 31b projects in a direction parallel to the axis of rotation D beyond the table surface 30 of the second table element 22. The edge protection profiles 31a, 31b therefore prevent spilt liquids from dripping in an unimpeded way from the table surfaces 26, 30 of the table element 20, 22 and secure, at least to a certain degree, items placed on the table surfaces 26, 30, such as documents, for example, from slipping off.

Figure 7:
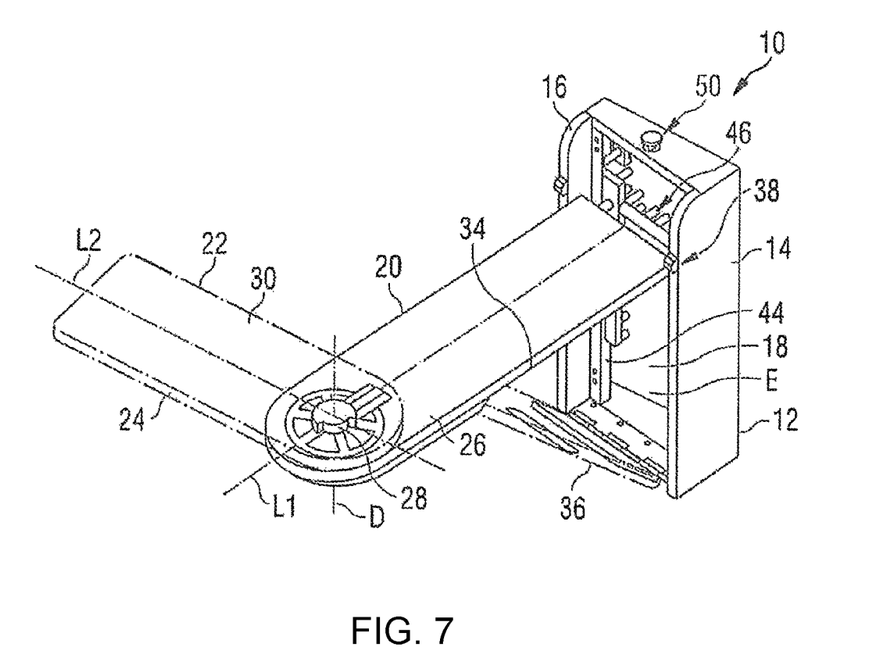
FIG. 7 shows the table arrangement according to FIG. 6A with a second table element drawn in a "transparent" view.
Figure 8:
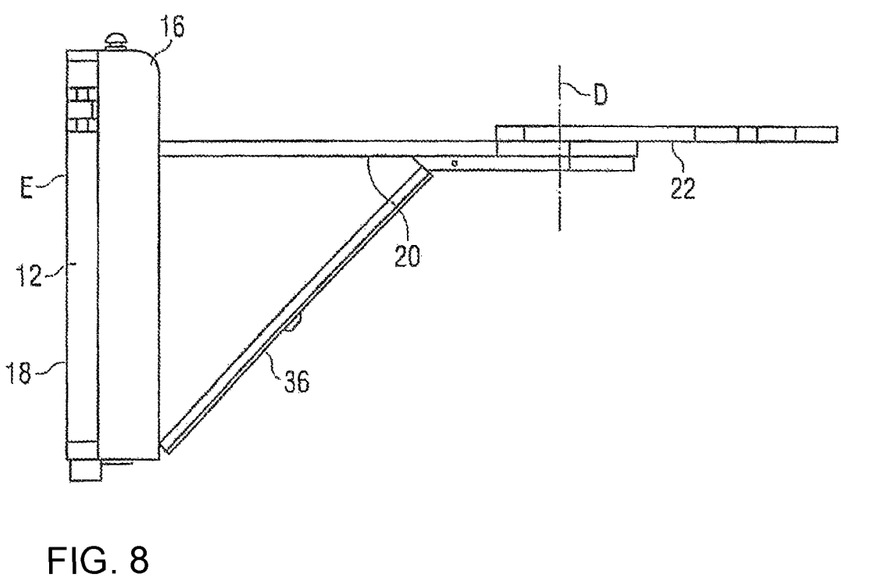
FIG. 8 is a side elevation view showing the table arrangement according to FIGS. 6A and 6B.

A frictional force generating element 28 illustrated in FIG. 7 is provided in a region of the axis of rotation D, the element being configured to minimize the unwanted movement of the second table element 22 relative to the first table element 20 about the axis of rotation D. This is important, in particular, when the table arrangement 10, as shown in FIG. 10, is installed in an aircraft passenger cabin and is to be used during the flight operation. In particular, the frictional force generating element 28 is arranged in the region of the axis of rotation D between the first table element 20 and the second table element 22, and may be made of a plastic material, an elastomer material or the like, for example.

The frictional force generating element 28 in this case is configured in such a manner that it produces a constant, permanent frictional force which is adjusted by means of a screw or the like during assembly of the table arrangement 10. However, the frictional force generating element 28 may also be configured in such a manner that the frictional force applied by it is variable and manually adjustable. A user of the table arrangement 10 can then rotate the second table element 22 about the axis of rotation D from its overlapping position into its working position, for example with the frictional force generating element 28 deactivated to begin with, and can subsequently activate the frictional force generating element 28, in order to keep the second table element 22 in its working position relative to the first table element 20.

Figure 4:
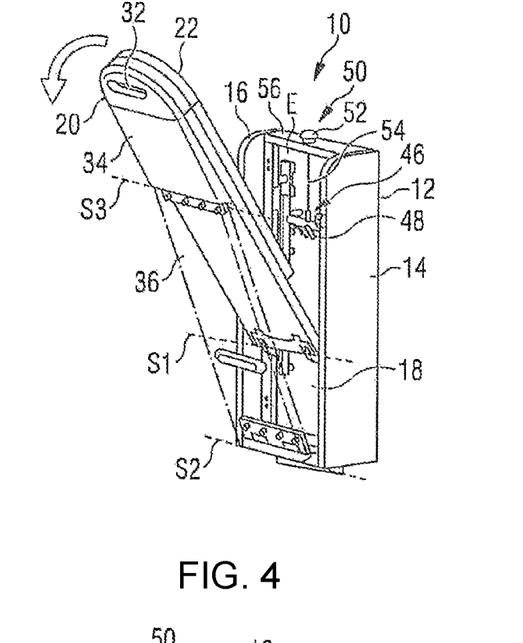
FIG. 4 is a perspective view of the table arrangement according to FIG. 3 during a transfer of the first table element from its stowage position into a position of use.

As can be seen most clearly from FIGS. 1, 3 and 4, a handle 32 is formed on the first table element 20. In particular, the handle 32 is arranged in the region of the end of the first table element 20 facing away from the first pivot axis S1 and is designed in the form of a recess which is formed in an underside 34 of the first table element 20 opposite the table surface 26 of the first table element 20. The handle 32 can be gripped by a user when the first table element 20 is to be jointly pivoted with the second table element 22 between its stowage position and its position of use.

The table arrangement 10 further comprises a support element 36, the first end of which is connected to the mounting element 12 so as to be pivotable about a second pivot axis S2. The second pivot axis S2 extends substantially parallel to the first pivot axis S1 and parallel to the mounting plane E defined by the mounting element 12. When the table arrangement 10, as shown in FIG. 10, is mounted in the aircraft passenger cabin area 100, the second pivot axis S2 is fixed to the mounting element 12 in a region of the mounting element 12 which is close to the floor.

By contrast, a second end of the support element 36 is connected to the first table element 20 so as to be pivotable about a third pivot axis S3. In particular, the second end of the support element 36 is connected to the underside 34 of the first table element 20, in such a manner that the support element 36 is pivotable relative to the mounting element 12 and the first table element 20 between a rest position, illustrated in FIGS. 1 and 3, and a support position, shown in FIGS. 5 to 9. In its rest position, which is adopted by the support element 36 when the first table element 20 is located in its stowage position, the support element 36 is arranged substantially parallel to the first table element 20. In its support position, which is adopted by the support element 36 when the first table element 20 is located in its position of use, in contrast the longitudinal axis L1 of the first table element 20 forms an angle of approx. 45° with a longitudinal axis L3 of the support element 36.

The support element 36 provides the first table element 20 with greater load-bearing capability, so that the first table element 20 can support a greater load than the second table element 22. The table arrangement 10 in the embodiment shown here can generally carry a load of 5 kg.

The table arrangement 10 comprises a securing mechanism 38 for securing the first table element 20 in its stowage position. The securing mechanism 38 comprises two securing levers 40, 42, each of which is attached to the side walls 14, 16 of the mounting element 12, so as to be rotatable about an axis of rotation. When the securing levers 40, 42 are located in a securing position, they lie against peripheral sections, which are opposite one another, of the support element 36 arranged in its rest position, and thereby keep the support element 36 in its rest position, see FIG. 1 in particular. In this way, the first table element 20 is also kept in its stowage position. On the other hand, when the securing levers 40, 42 are located in a release position, they release the support element 36 and consequently the first table element 20, so that the support element 36 can be moved into its support position, while the first table element 20 can be moved into its position of use, see FIGS. 3 to 5, in particular.

As can be seen most clearly by comparing FIGS. 3 to 5, the first pivot axis S1 is movable during a transfer from the first table element 20 between its stowage position and its position of use relative to the mounting element 12 between a rest position shown in FIG. 3 and an operating position illustrated in FIG. 5. The movement of the first pivot axis S1 relative to the mounting element 12 is a translational movement of the first pivot axis S1 in the mounting plane E defined by the mounting element 12. During a transfer of the first table element 20 between its stowage position and its position of use, the end of the first table element 20 facing the first pivot axis S1 therefore not only performs a pivoting movement about the first pivot axis S1, but also a translational movement in the mounting plane E.

The translational movement of the first pivot axis S1 in the mounting plane E is guided by a guiding device 44. The guiding device 44 comprises two guide rails which are substantially parallel to one another, in which one end of the first pivot axis S1 is displaceably received in each case. The guiding device 44, i.e., the guide rails of the guiding device 44 is/are fastened to the mounting element 12.

When the table arrangement 10, as shown in FIG. 10, is mounted ready for use on the fastening structure element 102, the first pivot axis S1 is displaced upwardly in the mounting plane E relative to the mounting element 12, when the first table element 20 is transferred from its stowage position into its position of use. Conversely, the first pivot axis S1 is displaced downwardly in the mounting plane E relative to the mounting element 12 when the first table element 20 is transferred from its position of use into its stowage position.

Moreover, the table arrangement 10 comprises a locking mechanism 46 for locking the first table element 20 in its position of use. The locking mechanism 46 comprises a first locking element 48 connected to the mounting element 12, see FIG. 4 in particular. In addition, the locking mechanism 46 comprises a second locking element (not shown in the figures) which is complementary to the first locking element 48 and connected to the first table element 20, and which is attached to the first table element 20 in the region of the end of the first table element 20 facing the first pivot axis S1.

The locking mechanism 46 is configured in such a manner that it can be activated by applying a compressive force (depicted by the arrow in FIG. 5) to the table surface 26 of the first table element 20 arranged in its position of use. In particular, the first and second locking element 48 of the locking mechanism 46 are arranged and constructed in such a manner that they automatically come into engagement with one another, as soon as a user applies a corresponding compressive force to the table surface 26 of the first table element 20 arranged in its position of use. In the arrangement shown in FIG. 5, in which the first table element 20 is overlapped by the second table element 20, the compressive force for activating the locking mechanism 46 is transferred to the table surface 26 of the first table element 20 via the table surface 30 of the second table element 22.

In addition, the locking mechanism 46 is configured in such a manner that its activation is associated with an audible noise. In particular, the first and the second locking element 48 of the locking mechanism 46 are constructed in such a manner that a clicking noise can be heard when the two locking elements 48 come into engagement with one another.

Finally, the table arrangement 10 comprises a manually actuatable release mechanism 50 for releasing the locking mechanism 46. The release mechanism 50 is fastened to the mounting element and comprises a control button 52 which is connected to the first locking element 48 of the locking mechanism 46 via a connection element 54. The control button 52 is fastened to a holding element 56 which extends between the two side walls 14, 16 of the mounting element 12. When a manual compressive force is exerted on the control button 52, this compressive force is transferred to the first locking element 48 by means of the connection element 54. In this way, the first locking element 48 is released from the second locking element, so that the first table element 20 can be pivoted from its position of use into its stowage position.

The invention claimed is:

1. A table arrangement for an aircraft, the table arrangement comprising:
    a mounting element to be fastened to a fastening structure element, said mounting element defining a mounting plane;
    a first table element connected to said mounting element, said first table element being pivotable relative to said mounting element about a first pivot axis between a stowage position, in which said first table element extends substantially parallel to said mounting plane defined by said mounting element, and a position of use, in which said first table element extends substantially perpendicular to said mounting plane defined by said mounting element; and
    a second table element connected to said first table element, said second table element being arranged substantially parallel to said first table element and being rotatable relative to said first table element about an axis of rotation arranged parallel to said mounting plane when said first table element is in the position of use; and
    said second table element being pivotable into an overlapping position, in which said first and second table elements overlap one another to a maximum, and into a working position, in which a longitudinal axis of said first table element encloses an angle of approximately 80 to 120° with a longitudinal axis of said second table element;
    said second table element being pivotable relative to said first table element about the axis of rotation between the overlapping position and the working position, and when said first table element is in the stowage position, said second table element is displaceable relative to said first table element in a direction parallel to the longitudinal axis of said first table element and the longitudinal axis of said second table element.

2. The table arrangement according to claim 1, wherein said first table element has a free end distally from said first pivot axis and wherein said second table element is connected to said first table element at said free end.

3. The table arrangement according to claim 1, further comprising a frictional force generating element disposed in a region of the axis of rotation between said first and second table elements, for minimizing an unwanted movement of said second table element relative to said first table element about the axis of rotation.

4. The table arrangement according to claim 1, wherein the angle enclosed between the longitudinal axis of said first table element and the longitudinal axis of said second table element is approximately 90 to 110°.

5. The table arrangement according to claim 1, wherein one or more of the following is true:
    said second table element has a smaller surface than said first table element; and/or
    said second table element has a shape that is congruent to a portion of said first table element; and/or
    said first table element is provided with a first edge protection profile which extends along at least a portion of a peripheral edge of said first table element and/or projects beyond a table surface of said first table element in a direction parallel to the axis of rotation; and/or
    said second table element is provided with a second edge protection profile which extends along at least a portion of a peripheral edge of said second table element and/or projects beyond a table surface of said second table element in a direction parallel to the axis of rotation; and/or the table surface of said first table element is an anti-slip surface; and/or the table surface of said second table element is an anti-slip surface.

6. The table arrangement according to claim 1, wherein at least one of the following is true:
said second table element is arranged relative to said first table element such that an underside of said second table element faces a table surface of said first table element;
said first table element and said second table element are dimensioned to enable three DIN A4 sheets to be placed on said first and second table elements; and/or
said first table element is has a size in a direction of the longitudinal axis thereof that is greater than a size in a direction perpendicular to the longitudinal axis; and/or
said second table element has a size in a direction of the longitudinal axis thereof that is greater than a size in a direction perpendicular to the longitudinal axis thereof; and/or
a handle is mounted to said first table element.

7. The table arrangement according to claim 1, wherein the first pivot axis is movable during a transfer of said first table element between the stowage position and the position of use relative to said mounting element between a rest position and an operating position.

8. The table arrangement according to claim 7, further comprising a guiding device for guiding a movement of the first pivot axis between said rest position and said operating position.

9. The table arrangement according to claim 1, wherein said mounting element comprises two side walls which extend substantially perpendicular to said mounting plane defined by said mounting element and substantially parallel to one another, and wherein said mounting element comprises a rear wall which extends substantially in said mounting plane defined by said mounting element.

10. The table arrangement according to claim 1, further comprising a locking mechanism for locking said first table element in the position of use.

11. The table arrangement according to claim 10, wherein said locking mechanism is configured for activation by applying a compressive force to a table surface of said first table element arranged in the position of use, or wherein said locking mechanism is configured to associate an activation thereof with an audible noise.

12. The table arrangement according to claim 10, further comprising a manually actuated release mechanism for releasing said locking mechanism.

13. The table arrangement according to claim 1, further comprising a support element, said supporting element having a first end pivotally connected to said mounting element about a second pivot axis, and a second end pivotally connected to said first table element about a third pivot axis, and wherein said support element is pivotable relative to said mounting element and said first table element between a rest position, in which said support element extends substantially parallel to said first table element, and a support position, in which a longitudinal axis of said first table element encloses an angle of about 30° to 60° with a longitudinal axis of said support element.

14. The table arrangement according to claim 13, wherein the angle between the longitudinal axis of said first table element and the longitudinal axis of said support element lies between 40° and 50°.

15. The table arrangement according to claim 13, wherein the angle between the longitudinal axis of said first table element and the longitudinal axis of said support element is approximately 45°.

16. The table arrangement according to claim 1, further comprising a securing mechanism for securing said first table element in the stowage position.

17. A passenger cabin area, which comprises:
a fastening structure element; and
a table arrangement according to claim 1, wherein the mounting element of said table arrangement is fastened to said fastening structure element.

18. The passenger cabin area according to claim 17, further comprising a flight attendant's seat fastened to said fastening structure element adjacent said table arrangement.

19. A table arrangement for an aircraft, the table arrangement comprising:
a mounting element to be fastened to a fastening structure element, said mounting element defining a mounting plane;
a first table element connected to said mounting element, said first table element being pivotable relative to said mounting element about a first pivot axis between a stowage position, in which said first table element extends substantially parallel to said mounting plane defined by said mounting element, and a position of use, in which said first table element extends substantially perpendicular to said mounting plane defined by said mounting element;
wherein, during a transfer of said first table element between the stowage position and the position of use, the first pivot axis is moved in linear translation in a mounting plane of said mounting element; and
a second table element connected to said first table element, said second table element being arranged substantially parallel to said first table element and being rotatable relative to said first table element about an axis of rotation arranged parallel to said mounting plane when said first table element is in the position of use.

* * * * *